United States Patent
Weber et al.

(10) Patent No.: US 7,583,904 B2
(45) Date of Patent: Sep. 1, 2009

(54) TRANSIMPEDANCE (TIA) CIRCUIT USABLE FOR BURST MODE COMMUNICATIONS

(75) Inventors: Raviv Weber, Herzliya (IL); Moshe Levy, Tel Mond (IL); Rafi Dvir, Holon (IL)

(73) Assignee: Broadlight Ltd., Ramat Gan (IL)

( * ) Notice: Subject to any disclaimer, the term of this patent is extended or adjusted under 35 U.S.C. 154(b) by 516 days.

(21) Appl. No.: 11/450,396

(22) Filed: Jun. 12, 2006

(65) Prior Publication Data

US 2007/0286611 A1  Dec. 13, 2007

(51) Int. Cl.
  *H04B 10/06* (2006.01)
(52) U.S. Cl. ................ 398/202; 398/206; 398/209; 398/210; 398/164
(58) Field of Classification Search ............ 398/202, 398/208, 209, 210, 211, 206, 164
  See application file for complete search history.

(56) References Cited

U.S. PATENT DOCUMENTS

| | | | |
|---|---|---|---|
| 6,552,605 B1 | 4/2003 | Yoon | |
| 6,686,799 B2 | 2/2004 | Ivry | |
| 6,720,827 B2 | 4/2004 | Yoon | |
| 6,876,259 B2 | 4/2005 | Visocchi | |
| 7,305,190 B2 * | 12/2007 | Mayampurath et al. | 398/202 |
| 7,394,996 B2 * | 7/2008 | Duanmu et al. | 398/202 |
| 2003/0092411 A1 * | 5/2003 | Ivry | 455/232.1 |
| 2003/0164731 A1 * | 9/2003 | Yoon | 330/9 |
| 2004/0190913 A1 * | 9/2004 | Seo et al. | 398/202 |
| 2004/0251403 A1 * | 12/2004 | Park et al. | 250/221 |
| 2005/0281565 A1 * | 12/2005 | Duanmu et al. | 398/214 |

* cited by examiner

*Primary Examiner*—Ken N Vanderpuye
*Assistant Examiner*—Hibret A Woldekidan
(74) *Attorney, Agent, or Firm*—The Nath Law Group; Derek Richmond (57) ABSTRACT

A transimpedance amplifier (TIA) circuit usable for burst mode communications is provided. The TIA circuit includes a TIA stage, a limiter-amplifier, and a DC restoration loop. The invention overcomes problems of the prior art relating to burst communications, such as a DC level in the output signal which can change from burst to burst and a duty-cycle distortion in large signals. This is achieved by using a DC restoration loop that ensures achieving zero DC potential within variable acquisition periods.

32 Claims, 6 Drawing Sheets

TRANSIMPEDANCE (TIA) CIRCUIT USABLE FOR BURST MODE COMMUNICATIONS

FIELD OF THE INVENTION

The present invention generally relates to transimpedance amplifiers (TIA) circuits, and in particular to burst mode TIA circuits of optical receivers.

REFERENCES CITED

Patents and Applications

| | | |
|---|---|---|
| U.S. Pat. No. 6,552,605 | April 2003 | Yoon |
| U.S. Pat. No. 6,720,827 | April 2004 | Yoon |
| U.S. Pat. No. 6,876,259 | April 2005 | Visocchi |
| U.S. Pat. No. 6,686,799 | February 2004 | Ivry |

BACKGROUND OF THE INVENTION

In the related art, most optical receivers and optical communications involve continuous mode communication. One new method for optical communication involves burst mode communication. Burst mode communication is useful, for example, in point to multipoint communication, such as occurs when a single operator is linked to many users. In such operation mode, many users are connected to a single operator using fiber optic lines that are split between the users. In order to prevent interference between the users, every user performs the transmission using a different carrier. Thus, at multiple times, the user communication is quiet, then the user starts a burst of transmission, and then the user shuts down again, waiting for a next period for transmission.

Figure 1A:
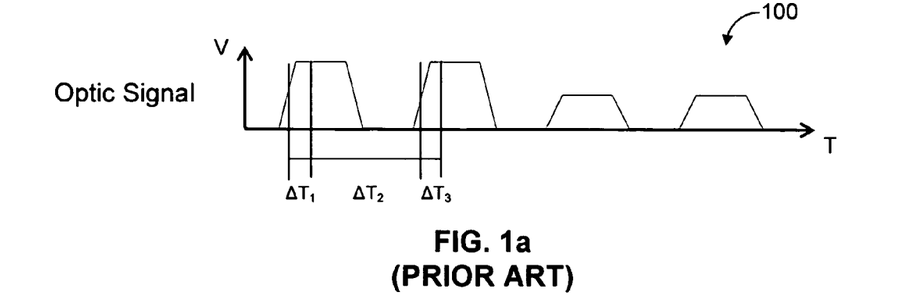
FIG. 1a is a graphical representation of a known burst input signal.

The difficulties of receiving and distinguishing between receivers are exacerbated by typically large variations in the magnitude of power of transmission bursts between different users. FIG. 1 is a graphical representation of a signal 100 demonstrating a low power burst following a high power burst, that typically occurs in a burst communication, and as is known in the art. The power difference between two successive bursts in signal 100 can be about 15-25 dB. Also, the high power burst can raise the average power level of a successive low power burst, which decays slowly over time.

Figure 2:
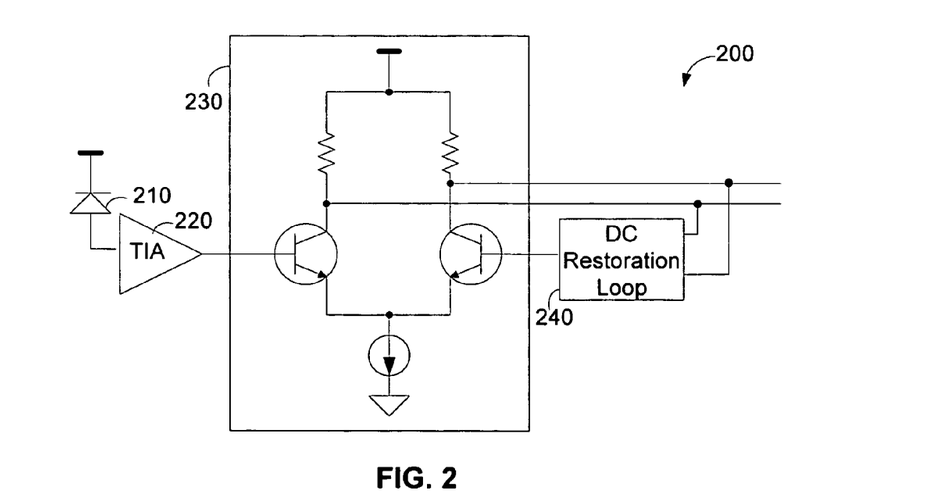
FIG. 2 is a typical architecture of a prior art optical receiver.

Architecture of the prior art for continuous mode optical receivers fail to operate properly for burst mode communications. FIG. 2 shows a typical architecture of a continuous mode optical receiver 200. The receiver 200 includes an optical detector (e.g., a photodiode) 210 coupled to an input of a transimpedence amplifier (TIA) 220, a limiter-amplifier 230, and a direct current (DC) restoration loop 240. The TIA stage 220 receives a weak signal output from the optical detector 210 coupled, for example, to an optical fiber line, and amplifies the signal. The limiter-amplifier 230 clips the output signal of the TIA stage 220 at specific high and low voltage levels.

The optical receiver 200 must discriminate between a high level and a low level signal that is received. The optical signal typically includes "on/off keying," which consists of transmitted "on" signals (also referred to as "ones") and "off" signals (also referred to as "zeros"). With an optical device, the transmitted "on" signal is a pulse of light, while the transmitted "off" signal is the non-transmittal of light. For this purpose, the current produced by the received light is amplified by the TIA 220 and the DC restoration loop 240 filters the noise from the amplified signal, i.e., removes the DC portion of the signal. Examples of circuits implementing DC restoration loops may be found in U.S. Pat. Nos. 6,876,259, 6,720,827, and 6,552,605, each of which is incorporated herein by reference for their useful background descriptions of the state of the art heretofore.

Since the data is transmitted in bursts, a problem arises in that the optical receiver 200 must receive and distinguish bursts of data. The receiver 200 must recognize each transmitter that transmits data, and the receiver typically must estimate the power of the data to distinguish among bursts. In order to make this determination, the receiver must acquire the signal for the data burst within a short time period at the beginning of the burst.

Figure 1B:
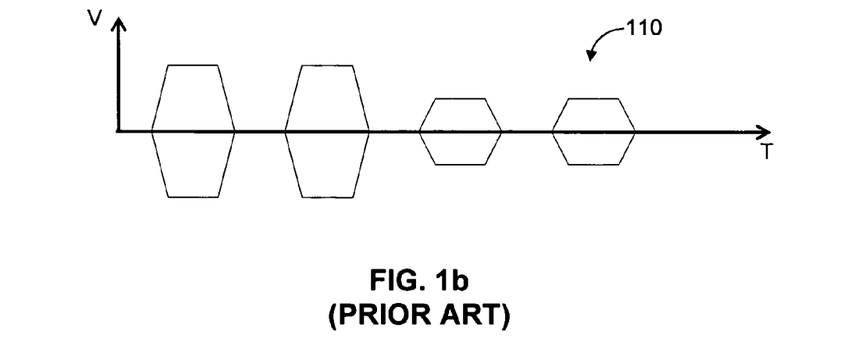
FIG. 1b is a graphical representation of an output signal generated by a conventional prior art optical receiver.

In the prior art, continuous mode transmission and reception has typically been used with two station transmitters, from which data is continuously transmitted. That is, no stopping and restarting of data occurs, as is the case with burst mode transmission. As a result, in continuous transmission, it has not mattered how long it takes for the receiver to acquire the signal, and thus the receiver is not designed to acquire signal in a short period of time as required in burst transmission. Furthermore, trying to perform DC restoration on burst signals, ends with the inability to differentiate between light and dark, i.e., between "ones" and "zeros". FIG. 1B shows an exemplary output signal 110 produced by the optical receiver 200 in response to the signal 100. In such signal a RX threshold that is typically utilized for distinguishing between "ones" and "zeros" cannot be properly set.

Therefore, it would be advantageous to provide a TIA circuit usable for burst mode communications.

SUMMARY OF THE INVENTION

It is therefore an object of the invention to provide a transimpedence amplifier circuit usable for burst mode communications.

This object is realized in accordance with a first aspect of the invention by a burst-mode transimpedance amplifier (TIA) circuit, comprising:
a TIA stage;
a limiter-amplifier having a first input coupled to said TIA stage, a second input coupled to a direct current (DC) restoration loop and two differential outputs coupled to said direct current (DC) restoration loop, wherein said differential outputs are also outputs of said burst-mode TIA circuit; and
a DC restoration loop coupled between the differential outputs and the second input of said limiter-amplifier and being configured to perform DC cancellation within variable acquisition periods.

According to a second aspect of the invention there is provided a burst-mode transimpedance amplifier (TIA) circuit, comprising:
a TIA stage;
a limiter-amplifier having a first input coupled to said TIA stage and a second input coupled to a first reference voltage;
a DC restoration loop having two differential outputs coupled to respective outputs of said limiter-amplifier and two inputs connected to said limiter-amplifier, wherein said DC restoration loop is capable of performing at least DC cancellation within variable acquisition periods.

According to a third aspect of the invention there is provided a burst-mode transimpedance amplifier (TIA) circuit, comprising:
a TIA stage;
a limiter-amplifier having a first input coupled to said TIA stage, a second input coupled to a first reference voltage and two differential outputs connected to a direct current (DC) restoration loop, wherein the differential outputs are also outputs of said burst-mode TIA circuit; and a DC restoration loop coupled to said differential outputs and being configured to perform DC cancellation within variable acquisition periods.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

The present invention provides a TIA circuit usable for burst mode communications. The TIA circuit includes a TIA stage, a limiter-amplifier, and a direct current (DC) restoration loop. The invention overcomes known problems relating to burst communications, such as a DC level in the output signal which can change from burst to burst, and a duty-cycle distortion in large signals. The present invention solves these problems by using a DC restoration loop that ensures achieving substantially zero DC potential within variable acquisition periods.

Figure 3:
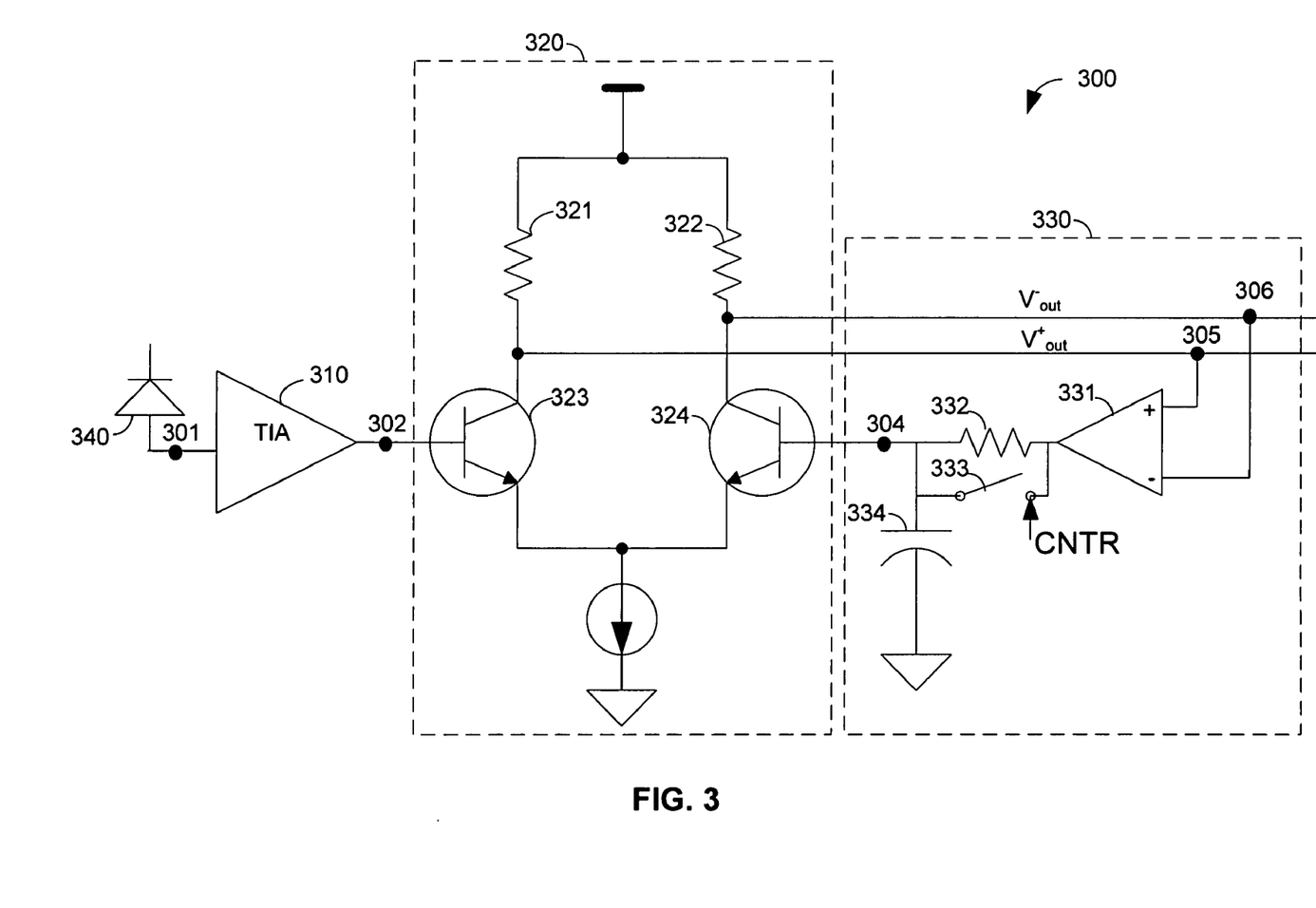
FIG. 3 is a burst-mode TIA circuit disclosed in accordance with an embodiment of the present invention.

FIG. 3 shows a non-limiting schematic diagram of a burst-mode TIA circuit 300 disclosed in accordance with an embodiment of the present invention. Biasing and other accompanying circuitry are not shown, merely for keeping the description simple and without limiting the scope of the disclosed invention. The TIA circuit 300 includes a TIA stage 310, a limiter-amplifier 320, and a DC restoration loop 330. The burst-mode TIA circuit 300 finds particular use in an optical receiver having an optical detector 340 coupled to an input of the TIA stage 310. The optical detector 340 may be, for example, a photodiode, a PIN diode, and the likes. The optical detector 340 produces current (Pcurrent) in proportion to the amount of light of the received optical signal. The photo current Pcurrent is provided as an input, in a port 301, to the TIA stage 310. The TIA stage 310 generates an amplified voltage signal, at a port 302, based on the current Pcurrent.

The limiter-amplifier 320 clips the TIA stage 310 output signal at specific high and low voltage levels. Specifically, the limiter-amplifier 320 multiplies the difference of two input voltage signals, fed to inputs 302 and 304, by the differential gain and provides differential voltage signals, $V^+_{out}$ and $V^-_{out}$ at outputs 305 and 306 respectively. The resistors 321 and 322 as well as the two transistors 323 and 324 of the limiter-amplifier 320 are identical. The limiter-amplifier 320 is the input stage of the DC restoration loop 330 which acts as a negative feedback loop. The DC restoration loop 330 is designed to ensure zero DC potential difference between outputs 305 and 306 regardless of the waveform of the input optical signal and the current Pcurrent.

The DC restoration loop 330 includes an integrator 331 (e.g., an operational amplifier (Op-Amp) that is configured to operate as integrator), a resistor 332, a switch 333, and a capacitor 334. For simplification of the description, the components utilized to form the integrator 331 (e.g., a capacitor connected between the output and the negative input port and other resistors) are not shown. The non-inverting and the inverting inputs of the integrator 331 are respectively connected to the outputs 305 and 306. The resistor 332 is coupled at one end to the output of the integrator 331 and is coupled at its other end to the input 304 of the limiter-amplifier 320. The capacitor 334 is coupled at one end to the input 304 of the limiter-amplifier 320, its other end being connected to GND. The switch 333 is switchably connected across the resistor 332 so that the resistor 332, the switch 333, and the capacitor 334 form a feedback network to set the DC cancellation. The output of the DC restoration loop 330 is connected to port 304 ($V^-_{in}$) of the limiter-amplifier 320. The switch 333 is controlled by control logic (not shown), which may or may not be part of the TIA circuit 300.

To allow the DC cancellation in circuit 300, i.e., zero DC potential difference between outputs 305 and 306, the integrator 331 measures the differential DC between these outputs and adds the measured offset to the input voltage of the limiter-amplifier 320. The DC offset is controlled by charging the capacitor 334 to a voltage having positive and negative potential as provided by the integrator 331. Specifically, if the voltage level of a signal in output 305 is higher than the level in the output 306, the capacitor 334 is charged to the positive potential difference of the outputs 305 and 306. On the other hand, if the voltage level of a signal at the output 305 is lower than the level of signal at the output 306, the capacitor 334 is discharged, i.e., it charges to the negative potential difference of the outputs 305 and 306.

The DC potential on the capacitor 334 provides a DC offset level required for the DC cancellation. Specifically, if the $V^+_{out}$ level (at the output 305) is higher than $V^-_{out}$ (at the output 306) the voltage level at the input 304 is increased. Consequently, the transistor 324 increases its current level, and hence lifts the voltage present at its emitter. The result is that the rise in the voltage at the input 304, while keeping the voltage level at the input 302 fixed, causes more current to flow via resistor 322 and less through resistor 321. This means that the voltage drop across resistor 321 reduces, hence the voltage at $V^+_{out}$ moves down towards $V^-_{out}$. Similarly, if $V^-_{out}$ is greater than $V^+_{out}$, the voltage level at the input 304 decreases, the voltage drop across the resistor 322 increases and the voltage $V^-_{out}$ moves up towards $V^+_{out}$.

The acquisition time required to achieve zero DC potential is controlled by the switch 333. A fast acquisition time is required at the beginning of the burst and slow acquisition when the circuit 300 is stabilized around a zero DC potential point. Fast acquisition is achieved by closing the switch 333. In such condition, the current does not flow via the resistor 332, but rather through the switch 333, and hence the capacitor 334 is rapidly charged. Once the switch 333 is opened, the current flows via the resistor 332, and hence the capacitor 334 is slowly charged. This allows reaching stable voltage levels at $V^+_{out}$ and $V^-_{out}$ without rippling the waveform of the output signals.

Switch 333 is switched in response to the optical input signal. Specifically, the switch 333 is opened, every time that the signal rises, for a preconfigured time interval (e.g., 35 nanoseconds). As an example, for the signal shown in FIG. 1a, the switch is open at $\Delta T_1$ and $\Delta T_3$ and stays closed at $\Delta T_2$.

Other embodiments for controlling the acquisition time are disclosed in U.S. Pat. No. 6,686,799, titled "Burst-mode Limited Amplifier" assigned to the common assignee and is incorporated herein by reference in its entirety.

Figure 4A:
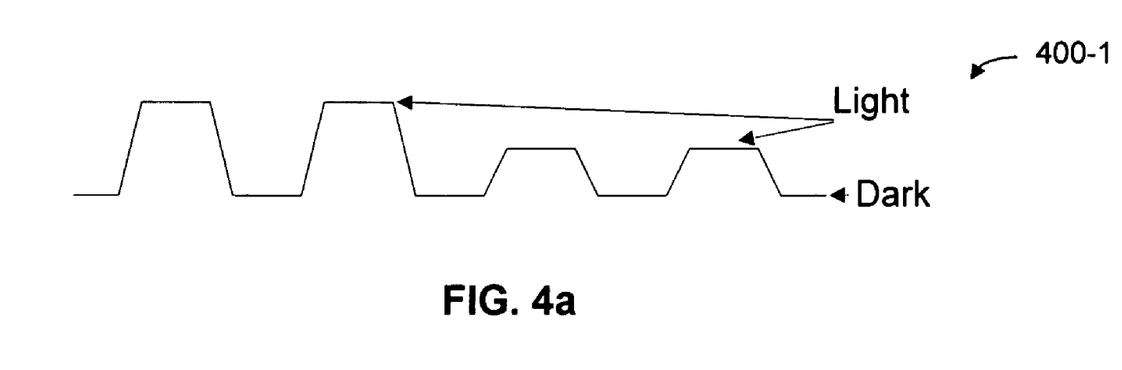
FIGS. 4a to 4d are exemplary graphs depicting DC cancellation according to an embodiment of the present invention.
Figure 4B:
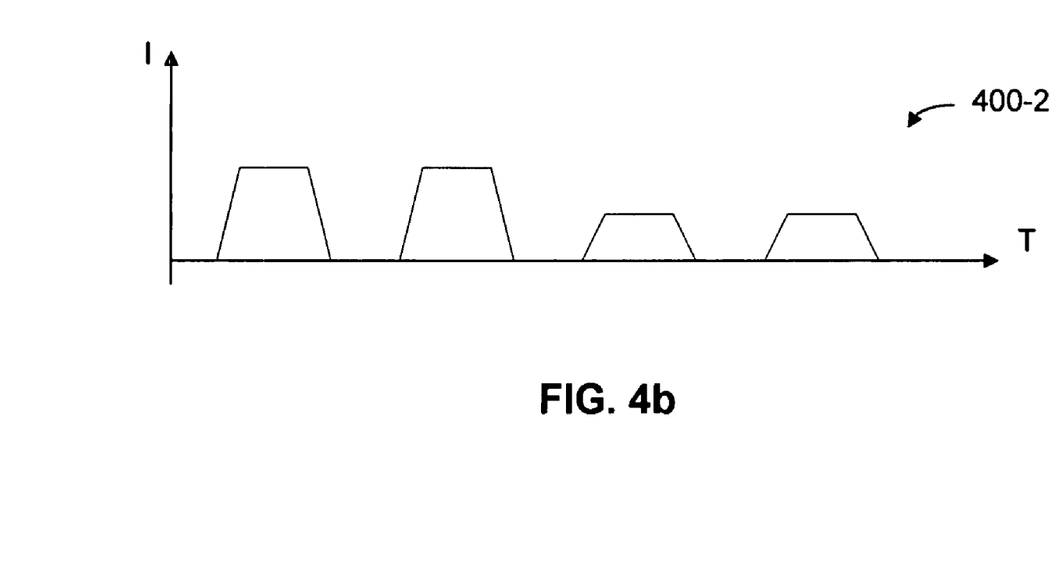
Figure 4C:
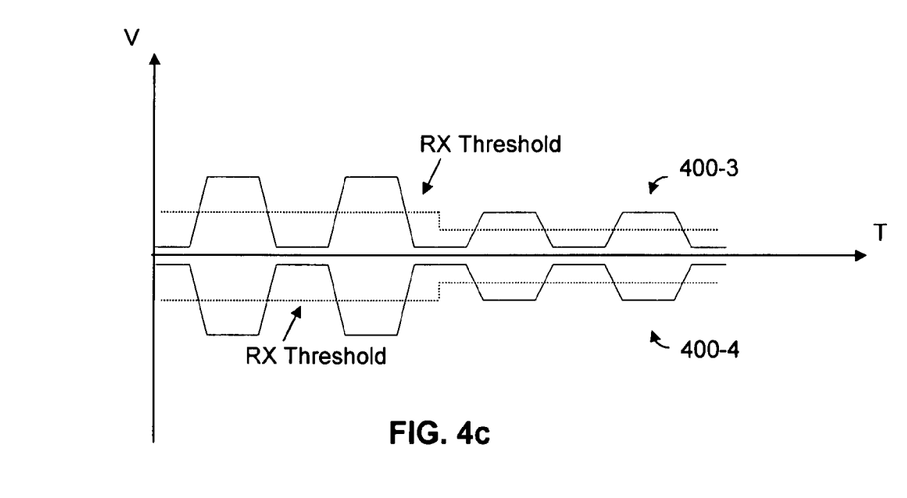
Figure 4D:
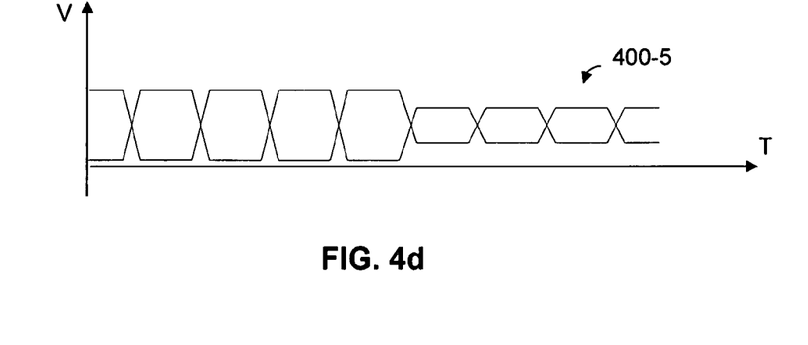

FIGS. 4a through 4d depict exemplary graphs of signals 400 exemplifying the operation of the TIA circuit 300. FIG. 4a shows an optical input signal 400-1 received at the optical detector 340. The signal 400-1 is a low power burst that follows a high power burst, as typically occurs in a burst communication. FIG. 4b shows a $P_{current}$ signal 400-2 generated by the optical detector 340 responsive to the signal 400-1. Ideally, a RX threshold should be set to the average of the peak and valley amplitudes of the optical detector 340. Not setting the RX threshold correctly would result in the inability to distinguish between "ones" and "zeros", and thus in data being lost. FIG. 4c shows $V^+_{out}$ and $V^-_{out}$ signals 400-3 and 400-4 at the outputs 305 and 306 respectively. These signals are generated in accordance with the techniques mentioned above and do not include any DC offset. As illustrated in FIG. 4c, the RX thresholds in signals 400-3 and 400-4 are set to be the average of the high and low level of each signal. FIG. 4d depicts a signal 400-5 in port 304, which is a superposition of the $V^+_{out}$ and $V^-_{out}$ signals. The "ones" and "zeros" can be easily detected in signal 400-5, i.e., each rise is "one" and each drop is "zero". This is opposed to signals generated by prior art circuits and shown, for example, in FIG. 1b.

Figure 5:
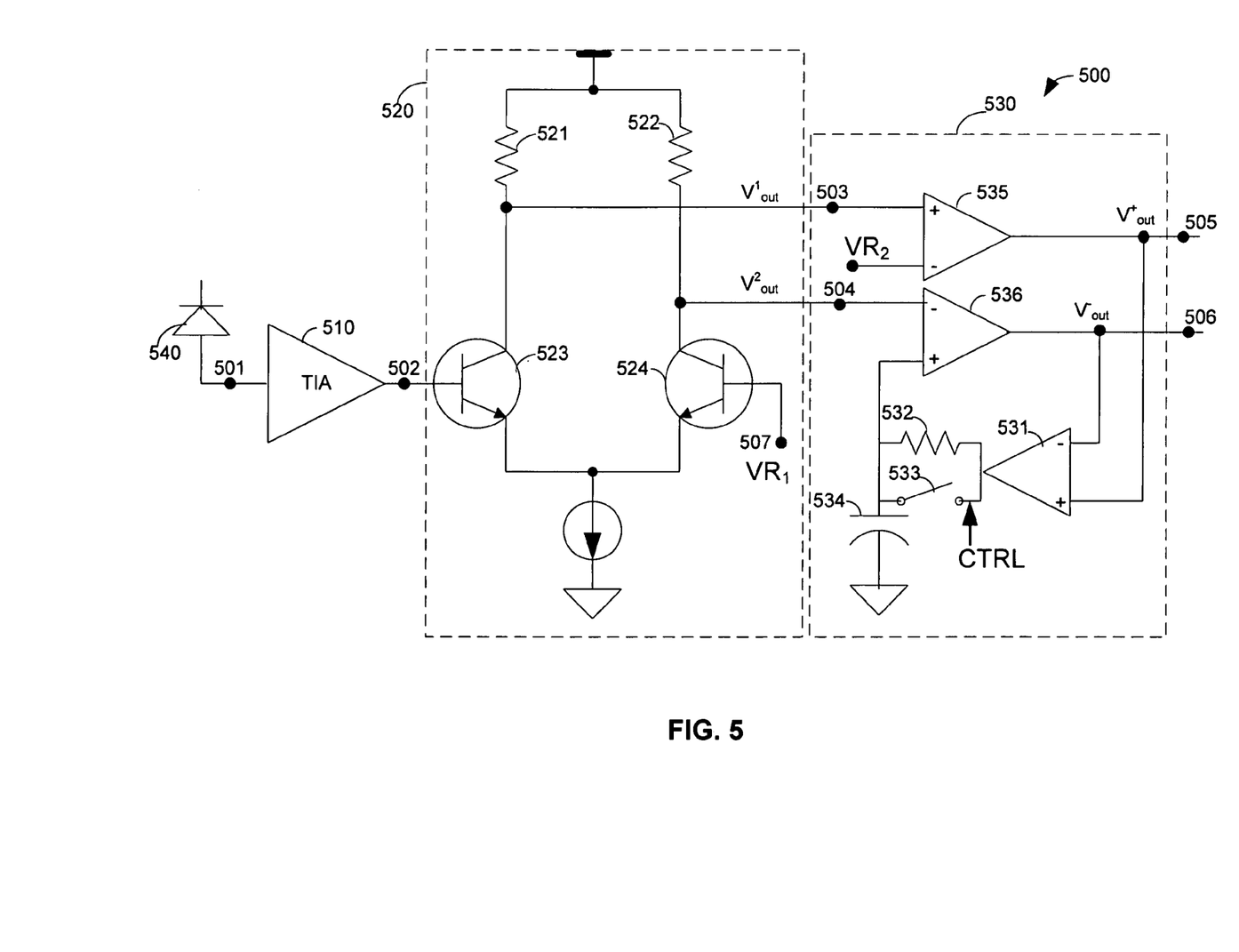
FIG. 5 is a burst-mode TIA circuit disclosed in accordance with an embodiment of the present invention.

FIG. 5 shows a non-limiting schematic diagram of a burst-mode TIA circuit 500 disclosed in accordance with another embodiment of the present invention. Biasing and other accompanying circuitry are not shown, merely for keeping the description simple and without limiting the scope of the disclosed invention. As shown in the figure, the circuit 500 is configured for use in an optical receiver that includes a TIA stage 510, a limiter-amplifier 520, and an optical detector 540 having the same functionality as described above. Circuit 500 further includes a DC restoration loop 530 and a first and second reference voltage levels ($VR_1$ and $VR_2$) utilized to perform at least DC cancellation. The $VR_1$ is set to a voltage level that limits the output voltage signals $V^+_{out}$ and $V^-_{out}$. The $VR_1$ is fed to an inverting input 504 of a limiter-amplifier 536.

The DC restoration loop 530 comprises an integrator 531, a resistor 532, a switch 533, a capacitor 534 and two differential amplifiers 535 and 536. The $VR_2$ reference is fed to the inverting input of the amplifier 535 and set to be approximately equal to the RX threshold. The output $V^-_{out}$ of the limiter-amplifier 520 is fed to the inverting input of the amplifier 536, whose non-inverting input is connected to the feedback network of the DC restoration loop 530. The feedback network comprises the resistor 532, switch 533, and capacitor 534. The resistor 532 and the capacitor 534 are commonly coupled at one end to the output of the integrator 531. An opposite end of the resistor 532 at coupled to the non-inverting input of the differential amplifier 536 and the capacitor 534 is connected at its other end to GND. The switch 333 is switchably connected across the resistor 532.

To reach zero DC potential difference between the outputs 505 and 506 of the TIA circuit 500, the integrator 531 measures the differential DC between these outputs. The capacitor 534 can be charged with a positive potential or "discharged" with a negative potential. The $V^+_{out}$ signal is the difference between the two voltages $V^1_{out}$ produced by the limiter-amplifier 520 and $VR_2$. The $V^-_{out}$ signal is the difference between the two voltages $V^2_{out}$ produced by the limiter-amplifier 520 and the potential on the capacitor 534. Therefore, charging the capacitor 534 to the difference between $V^+_{out}$ and $V^-_{out}$ ensures DC cancellation. For example, given that the level of the $V^1_{out}$ signal at the input 503 is +2V, $VR_2$ is set to +1V, and the level of the $V^2_{out}$ signal at the input 504, is −2V, then the voltage level of $V^+_{out}$ is +1V. Initially, the potential on the capacitor 534 is 0V, and thus the voltage level of $V^-_{out}$ is −2V. As a result the capacitor 534 becomes charged to a voltage level of +1V (i.e., the output of the integrator 531), and the thus the voltage level of $V^-_{out}$ moves up to −1V and the DC potential difference between $V^+_{out}$ and $V^-_{out}$ is zero. The acquisition time in the TIA circuit 500 is also controlled by the switching switch 533 as described in greater detail above.

Figure 6:
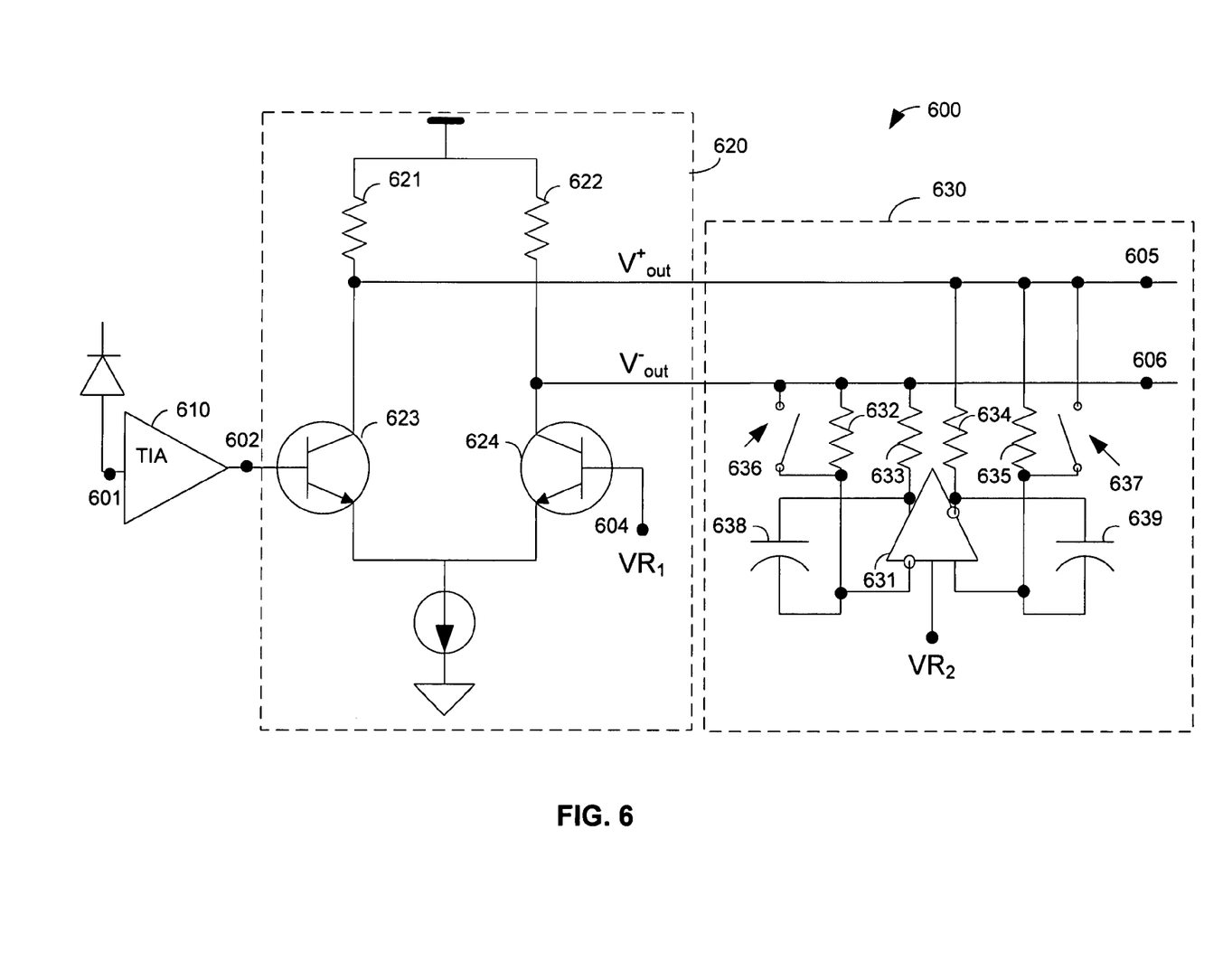
FIG. 6 is a burst-mode TIA circuit disclosed in accordance with an embodiment of the present invention.

FIG. 6 shows a non-limiting schematic diagram of a burst-mode TIA circuit 600 disclosed in accordance with yet another embodiment of the present invention. Biasing and other accompanying circuitry are not shown, merely for keeping the description simple and without limiting the scope of the disclosed invention. As shown in the figure, the circuit 600 is configured for use in an optical receiver that includes a TIA stage 610, a limiter-amplifier 620, and an optical detector 640 having the same functionality as described in greater detail above. The TIA circuit 600 further includes a DC restoration loop 630 and a first and second reference voltage level ($VR_1$ and $VR_2$) utilized to perform the DC cancellation. The $VR_1$ is set to a level that limits the output voltage signals $V^+_{out}$ and $V^-_{out}$. The $VR_1$ is provided in an input 604 of the limiter-amplifier 620.

The DC restoration loop 630 comprises an integrator 631 having respective inverting and non-inverting inputs and outputs, four resistors 632, 633, 634 and 635, two switches 636 and 637, as well as capacitors 638 and 639. The $VR_2$ reference is connected to the integrator 631 and approximately equal to the RX threshold. The inverting input of the integrator 631 is connected to one end of the resistor 632 and to one end of the capacitor 638. The other end of the resistor 632 is tied to the $V^-_{out}$ rail 606 and the other end of the capacitor 638 is coupled to the non-inverting output of the integrator 631. The non-inverting input of the integrator 631 is connected to one end of the resistor 635 and to one end of the capacitor 639. The other end of the resistor 635 is tied to the $V^+_{out}$ rail 605 and the other end of the capacitor 639 is coupled to the inverting output of the integrator 631. The resistor 633 is connected between the non-inverting output of the integrator 631 and $V^-_{out}$ rail 606. The resistor 635 is connected between the inverting output of the integrator 631 and $V^+_{out}$ rail 605. The switches 636 and 637 are connected across the resistors 632 and 635 respectively. That is, the capacitor 638 can be charged via the resistor 632 when the switch 636 is open or directly via the switch 636 when it is closed. Similarly, the capacitor 639 can be charged via the resistor 635 when the switch 637 is open or directly via the switch 637 when it is closed.

In such an arrangement, the resistors 632 and 633 together with the switch 636 and the capacitor 638 form a first feedback loop. Likewise, the resistors 634 and 635 together with the switch 637 and the capacitor 639 form a second feedback loop, and the acquisition periods are varied by switching the switches 636 and 637.

To reach zero DC potential difference in the TIA circuit 600, the integrator 631 measures the DC difference between two voltages $V^+_{out}$ and $V^-_{out}$ at the outputs 605 and 606 respectively. If the DC difference is not zero, the capacitors 638 and 639 are charged to adjust the voltage level of signal $V^+_{out}$ and $V^-_{out}$. Specifically, charging the capacitor 638 decreases the voltage level of $V^-_{out}$ and charging the capacitor 639 increases the voltage level of $V^+_{out}$. The acquisition time in the TIA circuit 600 is also controlled by switching the switches 636 and 637 using a control unit (not shown) as described above.

In accordance with a preferred embodiment of the present invention each of the burst-mode TIA circuits can be integrated in a receiver of an optical line terminal (OLT) of a passive optical network (PON). The OLT receives, via a fiber optic line, upstream signals sent from multiple optical network units (ONU). Typically, the ONU is installed in a central office (CO) and the ONUs may be geographically distributed. Thus, the communication between the OLT and ONUs is a burst communication.

The burst-mode transimpedance amplifier (TIA) circuit has been described with particular application to an improved optical receiver, wherein an optical detector is coupled to an input of the TIA stage of the burst-mode transimpedance amplifier (TIA) circuit. However, it is to be understood that the burst-mode transimpedance amplifier (TIA) circuit according to the invention finds general application in other types of circuit having other inputs, in which case there is no need for an optical detector. In any case, when used in optical receivers, the optical detector is generally part of the optical receiver although it may be integral with the burst-mode transimpedance amplifier (TIA) circuit if desired.

We claim:

1. A burst-mode transimpedance amplifier (TIA) circuit, comprising:
   a TIA stage;
   a limiter-amplifier having a first input coupled to said TIA stage, a second input coupled to a direct current (DC) restoration loon and two differential outputs coupled to said direct current (DC) restoration loop, wherein said differential outputs are also outputs of said burst-mode TIA circuit; and
   a DC restoration loop coupled between the differential outputs and the second input of said limiter-amplifier and being configured to perform DC cancellation within variable acquisition periods, wherein the DC cancellation ensures substantially zero DC potential difference between said differential outputs;
   wherein said DC restoration loop comprises:
      an integrator having inverting and non-inverting inputs coupled to said differential outputs and an output port;
      a resistor coupled to the output port of said integrator;
      a switch switchably coupled across said resistor; and
      a capacitor having a first end coupled to a common junction of said switch and said resistor and having a second end connected to ground.

2. The circuit of claim 1, wherein the circuit is part of an optical receiver that comprises an optical detector coupled to an input of said TIA stage.

3. The circuit of claim 1, wherein said limiter-amplifier is capable of producing limited differential voltage signals.

4. The circuit of claim 1, wherein the switch is configured to vary acquisition periods according to whether said switch is open or closed.

5. The circuit of claim 4, wherein closing said switch allows for a fast acquisition.

6. The circuit of claim 5, wherein said switch is adapted to remain closed for a preconfigured time interval every time that the photo current signal rises.

7. The circuit of claim 4, wherein opening said switch allows for a slow acquisition.

8. The circuit of claim 1, wherein said integrator is adapted to measure a DC difference between the differential outputs.

9. The circuit of claim 8, wherein said capacitor is charged to the DC difference.

10. A burst-mode transimpedance amplifier (TIA) circuit, comprising:
    a TIA stage;
    a limiter-amplifier having a first input coupled to said TIA stage and a second input coupled to a first reference voltage;
    a DC restoration loop having two differential outputs coupled to respective outputs of said limiter-amplifier and two inputs connected to said limiter-amplifier, wherein said DC restoration loop is capable of performing at least DC cancellation within variable acquisition periods, wherein the DC cancellation ensures substantially zero DC potential difference between said differential outputs;
    wherein said DC restoration loop, comprises:
       a first integrator having an inverting input coupled to a second reference voltage and a positive input port coupled to said limiter-amplifier;
       a second integrator having a non-inverting input coupled to a feedback net and a negative input port coupled to said limiter-amplifier;
       a third integrator having a non-inverting input coupled to an output of said first integrator and an inverting input coupled to an output of said second integrator;
       a resistor coupled to the output of said third integrator and to a first end of a capacitor coupled at opposite end to GND; and
       a switch switchably coupled across said resistor;
          wherein said capacitor, said switch and said resistor form said feedback net.

11. The circuit of claim 10, wherein the circuit is part of an optical receiver that comprises an optical detector coupled to an input of said TIA stage.

12. The circuit of claim 10, wherein said limiter-amplifier is capable of producing differential voltage signals, wherein the voltage signals are limited by the first reference voltage.

13. The circuit of claim 10, wherein the variable acquisition periods are achieved by switching said switch.

14. The circuit of claim 13, wherein closing said switch allows for a fast acquisition.

15. The circuit of claim 14, wherein said switch is closed, for a preconfigured time interval, every time that the photo current signal rises.

16. The circuit of claim 13, wherein opening said switch allows for a slow acquisition.

17. The circuit of claim 10, wherein said third integrator measures a DC difference between the differential outputs.

18. The circuit of claim 17, wherein said capacitor is charged to the measured DC difference.

19. The circuit of claim 10, wherein the second reference voltage is set to an average of peak and deep amplitudes of said optical detector.

20. The circuit of claim 10, wherein said burst-mode TIA circuit is operative in at least an optical line terminal (OLT) of a passive optical network (PON).

21. A burst-mode transimpedance amplifier (TIA) circuit, comprising:
    a TIA stage;
    a limiter-amplifier having a first input coupled to said TIA stage, a second input coupled to a first reference voltage and two differential outputs connected to a direct current (DC) restoration loop, wherein the differential outputs are also outputs of said burst-mode TIA circuit; and
    a DC restoration loop coupled to said differential outputs and being configured to perform DC cancellation within variable acquisition periods, wherein performing said DC cancellation ensures substantially zero DC potential difference between said differential outputs;
    wherein said DC restoration loop comprises:

an integrator having an inverting input and a non-inverting output coupled to a first feedback loop and a non-inverting input and invert output coupled to a second feedback loop, wherein the integrator is further coupled to a second reference voltage;

a first feedback loop including a first resistor coupled between the non-inverting output and a first one of the differential outputs, a second resistor coupled between the inverting input and the first differential output, a first switch switchably coupled across said second resistor and a first capacitor connected between the inverting input and the non-inverting output; and a second feedback loop including a third resistor coupled between the inverting output and a second one of the differential outputs, a fourth resistor coupled between the non-inverting input and the second differential output, a second switch switchably coupled across said fourth resistor and a second capacitor connected between the non-inverting input and the inverting output.

22. The circuit of claim 21, wherein the circuit is part of an optical receiver that comprises an optical detector coupled to an input of said TIA stage.

23. The circuit of claim 21, wherein said limiter-amplifier is capable of producing differential voltage signals, wherein the voltage signals are limited by the first reference voltage.

24. The circuit of claim 21, wherein the variable acquisition periods are achieved by switching said first switch and said second switch.

25. The circuit of claim 24, wherein closing said first switch and said second switch allows for a fast acquisition.

26. The circuit of claim 25, wherein said first switch and said second switch remain closed for a preconfigured time interval, every time that the photo current signal rises.

27. The circuit of claim 24, wherein opening said first switch and said second switch allows for a slow acquisition.

28. The circuit of claim 27, wherein said integrator measures a DC difference between the differential outputs.

29. The circuit of claim 28, wherein said first capacitor and said second capacitor are charged to the measured DC difference.

30. The circuit of claim 29, wherein charging said first capacitor decreases the voltage level of a negative output voltage signal.

31. The circuit of claim 29, wherein charging said second capacitor increases the voltage level of a positive output voltage signal.

32. The circuit of claim 21, wherein said burst-mode TIA circuit is operative in an optical line terminal (OLT) of a passive optical network (PON).

* * * * *